July 29, 1941.   W. V. ALLIN   2,250,942
MINNOW BUCKET
Filed Feb. 19, 1940
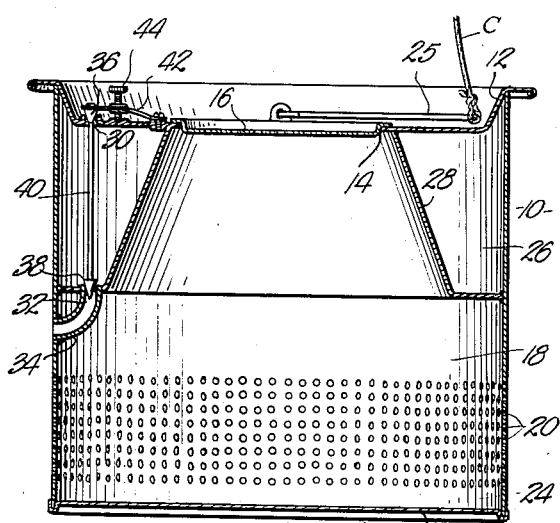
Fig. 1.
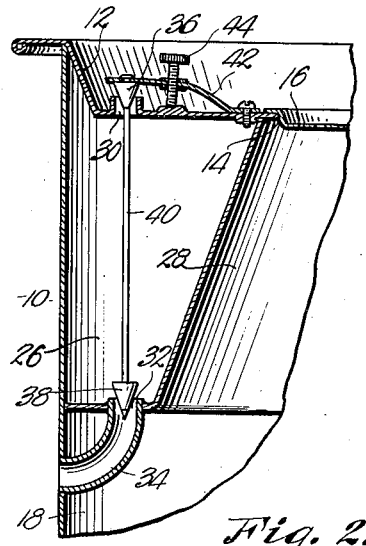
Fig. 2.
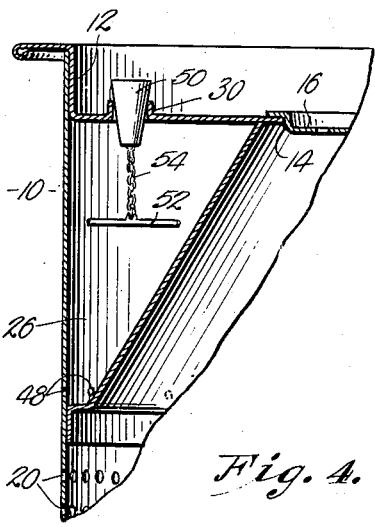
Fig. 3.
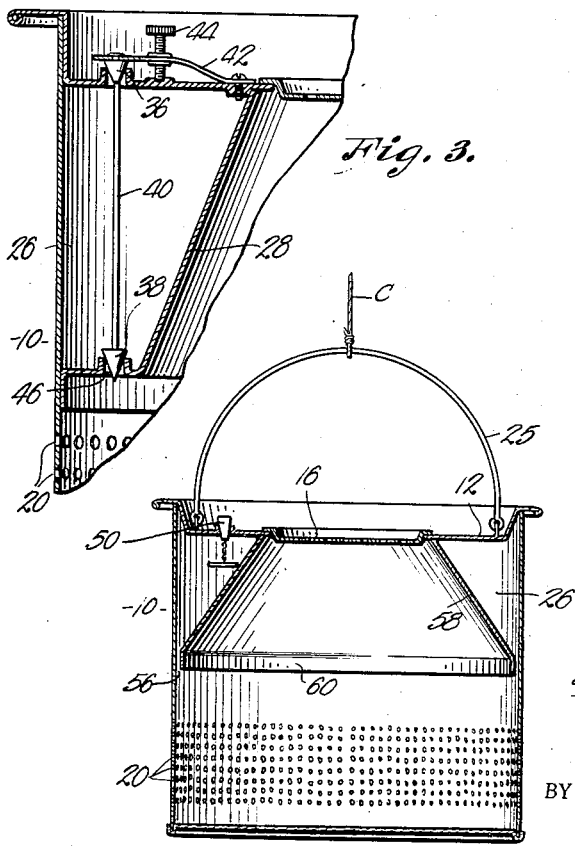
Fig. 4.
Fig. 5
INVENTOR,
Willard V. Allin.
BY Hovey & Hamilton
ATTORNEYS.

Patented July 29, 1941

2,250,942

UNITED STATES PATENT OFFICE 2,250,942

MINNOW BUCKET

Willard V. Allin, Kansas City, Mo.

Application February 19, 1940, Serial No. 319,715

6 Claims. (Cl. 43—56)

This invention relates to improvements in minnow buckets and has particular reference to a minnow bait bucket which can be floated or immersed.

The principal object of this invention is the provision of a minnow bucket of the floating type that can be easily converted into a non-floating bucket without interfering with the minnows within the minnow compartment.

Another object of the present invention is the provision of a minnow bucket having a float chamber with a top and bottom port provided with means whereby they may be simultaneously opened or closed.

A further object is the provision of a minnow bucket having a float chamber containing vertically spaced apart ports, provided with interconnected closures which are normally urged to the closed position by a spring member.

Other objects will appear during the course of the specification, referring to the drawing wherein:

Figure 1 is a sectional view of a minnow bucket embodying this invention.

Fig. 2 is an enlarged fragmentary sectional view of a portion of the minnow bucket with the valves shown in the open position.

Fig. 3 is a modified form of minnow bucket with the lower float chamber port communicating with the minnow compartment.

Fig. 4 is a further modification of the device wherein the lower port comprises a series of small holes that are constantly open; and Fig. 5 is another modified form of the bucket wherein the float chamber has a narrow annular lower opening which is sealed by the water when the bucket is in the operative position in the water.

Throughout the several views, like reference characters refer to similar parts and the numeral 10 is the inside container of the ordinary two-piece minnow bucket embodying the improvements of this invention.

Since the outside container of this type of minnow bucket is used only when the minnows are being transported to and from the lake, it is not deemed necessary to show the outer container, but simply state that the container 10 is adapted to be fitted into a suitable outside container.

The bucket may be round, oval or any other desired shape and is provided with a concave top 12 having a central opening 14 provided with a perforated lid 16. The opening 14 communicates with the minnow compartment 18 which is provided adjacent its lower portion with a band of perforations 20 for the free flow of water thereto. It will be noted that these perforations are disposed slightly above the bottom 22 of the container, thus producing a shallow basin 24 from which the water cannot flow when the bucket is removed from the water and in which the minnows will have limited range so that they can be easily caught. A suitable bail 25 is provided for convenience of handling the container.

The upper portion of container 10 is provided with an air or float compartment 26, made with inclined wall 28, which converges to the opening 14, thus facilitating the removal of the minnows and also because of its position adding to the stability of the floating bucket. A port opening 30 through top 12 communicates with the air compartment 26 and port 32 communicates with the lower portion of the air chamber and outside of container 10 through elbow 34.

Ports 30 and 32 are disposed in vertical, axial alignment when the container is in the operative position. These ports 30 and 32 are adapted to be normally closed by valves 36 and 38 respectively. These valves are interconnected by a stem 40 so that they are simultaneously operable to open and close the ports.

A leaf spring 42 secured at its one end to top 12, with its free end secured to valve 36 by stem 40 is so formed that it constantly urges the valves to the closed position. An adjusting screw 44 is threaded through the central portion of leaf spring 42 and is adapted to be turned to force the free end of the spring upwardly to cause the valves to be raised to open ports 30 and 32. The end of screw 44 rests against top 12 and will maintain the valves in the open position until the screw is reversed and the spring is permitted to retract to close the valves. When the valves are open, they are still partially inserted into the ports, thus insuring their proper positioning at all times.

The single type minnow bucket is especially suited for use with this preferred form of the invention and varies principally in the fact that it has no perforations 20 and is adapted to retain the minnow compartment full of water at all times. Because port 32 communicates with the outside of the container, the water passing to or from the air chamber would not interfere with the liquid level in the minnow compartment.

The modified form shown in Fig. 3, is similar to the form just described, with slight change in the bottom port 46, which communicates directly with the minnow compartment 18, and is especially suitable for use in the open side containers usually found in the two-piece buckets.

Referring now to the modified form, which is shown in Fig. 4, the air compartment is provided adjacent its bottom, with a series of small openings 48, which communicate with the outside of the container, and when the port 30 is opened by removing valve 50, water rushes in the open ports to replace the air which escapes through port 30.

A cross bar 52, secured to the lower end of valve or cork 50, by means of a flexible member 54, prevents the accidental removal of the valve from the apparatus. This type of float construction is well suited for use with either the perforated or non-perforated type of minnow containers.

The modified form shown in Fig. 5 is similar to that shown in Fig. 4, and differs slightly in that the bottom port 56 consists of a continuous narrow opening extending around the inner wall of the container. The conical inner wall 58 of the air chamber 26 is slightly flanged at 60 and slightly spaced apart from the wall of container 10. This annular port 56 is sufficiently narrow to preclude minnows from the air chamber but is sufficiently large to permit rapid filling of the air chamber with water when the valve 50 is removed.

The operation of the minnow bucket as shown in Figs. 1 and 2 is as follows:

When the valves are in position as shown in Fig. 1, container 10 will float at the surface of the water so that it will be conveniently near the fisherman. In order to protect the fish against the heat and sun, it is sometimes desirable to sink the bucket to the bottom of the lake or to a depth below the surface. By operating screw 44 the valves 36 and 38 are raised to the open position and water will gradually fill air compartment 26 as the air is forced out through port 30.

The specific gravity of the bucket is such that it will now settle to the bottom of the lake and will so remain until it is removed to the surface by means of the cord C, which is secured to the bail 25. When it is again desired to float the bucket, it is raised above the surface so that the water will flow by gravity through port 32 as air enters port 30; after the water has been expelled the valves are again closed and the air chamber will function to cause the bucket to float.

It is apparent that all the forms of buckets shown and described are adapted to be regulated to float or sink while they are held in the vertical position, thereby making it unnecessary for the operator to tilt the bucket, which is objectional in the handling of live bait.

Slight changes might be made in the form and positions of the various parts without departing from the spirit of the invention, and it is therefore desired to be limited only by the scope of the appended claims.

Having thus described the invention, what is claimed as new and desired to be secured by Letters Patent is:

1. A minnow bucket comprising a container having a minnow compartment and an upper air compartment having an annular bottom opening at its lowest extremity, and a manually operable valve at the top portion of said air compartment operable to release the air therefrom, whereby water will flow therein through the bottom opening and cause the bucket to sink.

2. A minnow bucket comprising a container having a minnow compartment and an upper air compartment having a port in the bottom portion and a port in the top portion thereof, valve members on a common stem adapted to normally close the respective ports and to be adjusted to simultaneously open said valves whereby water is admitted to the air compartment through the bottom port.

3. A minnow bucket comprising a container having a minnow compartment, an annular air compartment at the upper portion of said container having a top port and a bottom port communicating with the outside of said container, and a closure for said top port whereby air is normally maintained in the air compartment to float the bucket and which is removable to open the top port to release the air and permit the bucket to sink.

4. A minnow bucket comprising a container having a minnow compartment, an air chamber encircling the upper portion of said container, having a top port and a bottom port communicating with the outside of said container, and a double valve member normally urged to simultaneously close said ports and manually operable means to simultaneously open said ports to permit air to escape from the upper port and water to enter the bottom port whereby the bucket is permitted to sink.

5. A minnow bucket comprising a container having a minnow compartment, an air chamber around the outer and upper portion of said container having a top port and a series of relatively small bottom ports communicating with the outside of said container, and a valve for said top port whereby the air is normally retained in said air chamber and which is removable to permit the escape of air from the air chamber and to admit water thereto to sink the bucket.

6. A minnow bucket comprising a container having a minnow compartment, an air chamber disposed about the upper portion of the container having a top port and a continuous narrow port about its lower portion communicating with the minnow compartment, and a valve for said top port adapted, when closed, to retain air in said chamber to float the bucket and when opened to permit water to enter said chamber to permit the bucket to sink.

WILLARD V. ALLIN.